United States Patent Office 3,180,533
Patented Apr. 27, 1965

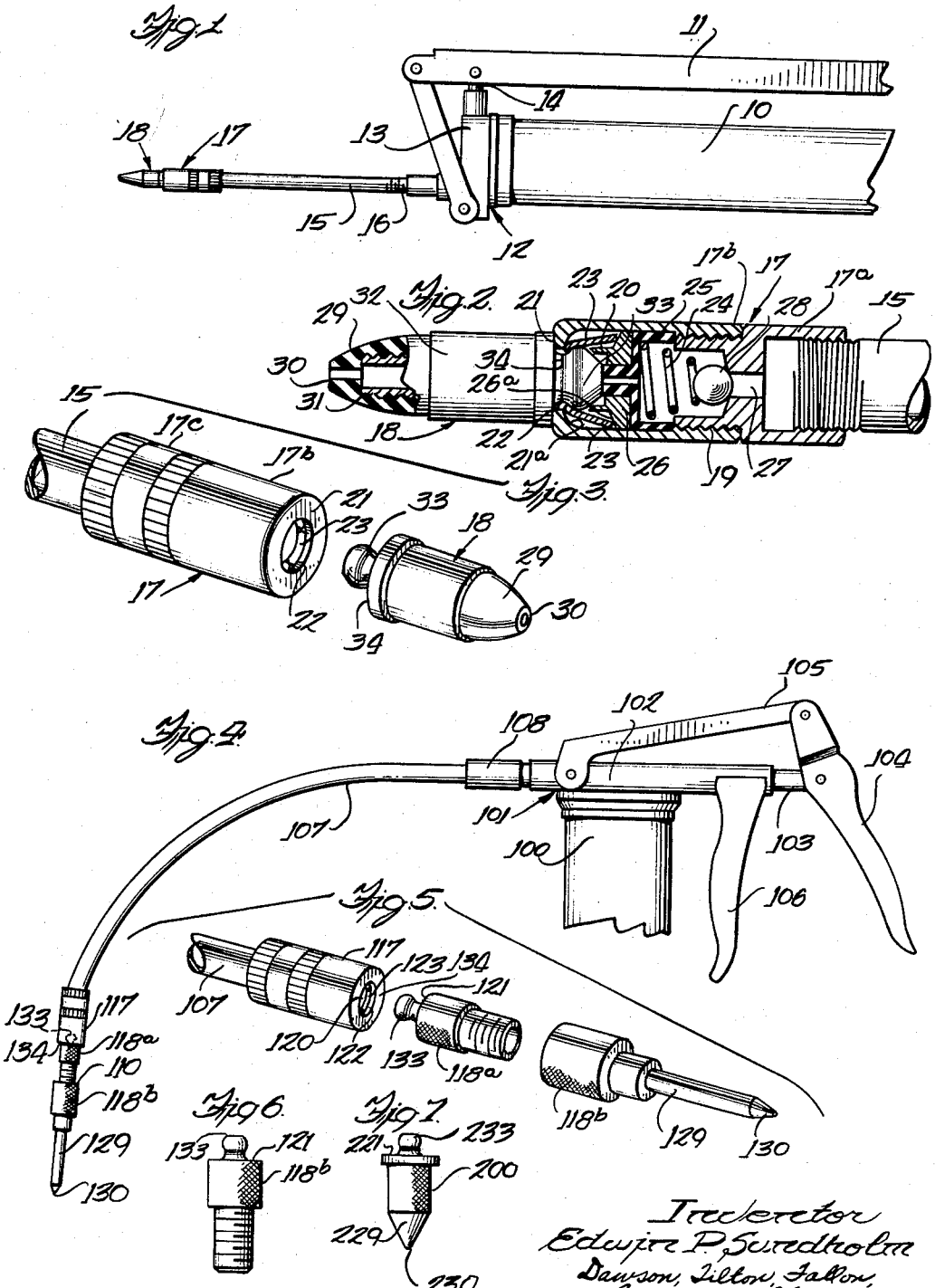

3,180,533
FITTING AND HAND-OPERATED GREASE GUN
Edwin P. Sundholm, Albert City, Iowa
Filed Aug. 14, 1963, Ser. No. 302,153
8 Claims. (Cl. 222—256)

This invention relates to a fitting for a hand-operated grease gun. The fitting of this invention has particular utility for use in combination with a hydraulic coupler where the combination of the fitting and coupler are moved from point to point in applying the grease.

Hand-operated grease guns are widely used for applying grease to automotive vehicles and farm machinery. Such grease guns are compact, lightweight, and can readily be moved from point to point for the application of the grease by an individual operator. At the present time, lever-operated grease guns are most commonly used. In dispensing the grease from such guns, the operator must grasp the barrel with one hand, and the dispensing lever with the other. Considerable force must be applied to generate the required pressure within the high pressure cylinder of the dispensing head. The operator therefore does not have a free hand for holding or directing the grease applicator conduit, or associated coupler and fitting.

A similar problem is encountered with hand-operated grease guns of the pistol-grip type, especially when a flexible applicator conduit is employed. One hand of the operator is required to operate the handles of the "pistol-grip" which generate the pressure within the high pressure cylinder. The other hand of the operator may be placed on the barrel of the grease gun, or with certain designs of pistol-grip grease guns, the operator's hand can be used to some extent to direct the application of the grease.

With fixed or permanent-type grease fittings which are attached to the automobile or tractor, the above problems are not particularly troublesome. The hydraulic coupler of the grease gun is snapped on over the grease fitting, and remains attached thereto during the application of the grease. It is not necessary for the operator to direct the hydraulic coupler to a specific point or to exert any force on it once it has been snapped on the fitting. A much different situation is presented, however, when it is desired to provide the grease gun with a series of interchangeable adapter-type fittings, which are moved from point to point during the application of the grease. With such fittings, the grease is applied to an orifice rather than to a permanent grease fitting. When not being used such grease application orifices will normally be capped. In use, the cap is removed, and the mobile grease fitting or adapter is pressed against and somewhat into the orifice for application of the grease. Obviously, this requires the operator to direct the grease fitting and to exert pressure thereon at all times during the application of the grease. For reasons previously indicated, this is difficult with hand-operated grease guns, where the hands of the operator are normally rather fully occupied with the manual pumping of the grease.

It is therefore an object of this invention to provide a grease fitting of the mobile-type for use in combination with a grease gun coupler which substantially overcomes the problems and difficulties described above. More specifically, it is an object of this invention to provide a mobile grease fitting which when snapped into the grease coupler forms a substantially rigid unit therewith, thereby greatly facilitating the application of the grease. Further objects and advantages will be indicated in the following detailed specification.

This invention is shown in illustrative embodiments in the accompanying drawing, wherein—

FIGURE 1 is a side elevational view of a lever-operated grease gun, the barrel portion of which is partially broken away, wherein the grease gun is equipped with the fitting and coupler combination of this invention;

FIGURE 2 is an enlarged view of the coupler and fitting combination of the grease gun of FIGURE 1, the assembly being shown in section and/or partially broken away;

FIGURE 3 is a perspective view of the same coupler and grease fitting, the parts being shown in separated relation as they would appear immediately before connection of the parts;

FIGURE 4 is a side elevational view of a hand-operated grease gun of the pistol grip-type, the barrel of the grease gun being partly broken away, wherein the grease gun is equipped with a modified form of the coupler and fitting combination of this invention;

FIGURE 5 is a perspective view of the components of the coupler and fitting combination with which the gun of FIGURE 4 is equipped, the parts being shown in separated relation;

FIGURE 6 is a side elevational view of the fitting connector as employed in the embodiment of FIGURES 4 and 5; and FIGURE 7 is a side elevational view of another grease fitting and incorporating the feature of the present invention which can be substituted for the grease fitting of FIGURES 1 to 3.

Looking first at FIGURE 1, there is shown a typical lever-operated grease gun having a barrel 10, and operating handle or lever 11, and a grease dispensing head designated generally by the number 12. The dispensing head 12 provides a high pressure cylinder 13 within which a piston 14 reciprocates through the action of lever 11 and link 14 to dispense grease at high pressure through an outlet pipe 15. In the illustration given, outlet pipe 15 is rigid, being formed of metal, and is rigidly connected to the dispensing head 12 through a threaded connection at 16.

The grease gun of FIGURE 1 also includes a hydraulic coupler designated generally by the number 17 and a grease fitting designated generally by the number 18. These components, which incorporate the distinctive feature of the present invention, will now be described in detail. It will be understood that the hydraulic coupler 17 is not new in itself, the novelty of the present invention residing particularly in the design of the grease fitting 18 and the special cooperation of the fitting with the coupler.

As shown more clearly in FIGURE 2, the coupler 17 includes a connector section 17a and a coupler body 17b. These parts are threadedly connected at 19.

Connector body 17b provides a socket 20 in its outer end portion and a transversely-extending rim 21 surrounding the mouth 22 of the socket. Coupler 17 also includes segmental clamping jaws 23. As is the common practice three of the clamping jaws 23 are provided. These clamping jaws are spring biased by means of a coil spring 24, which acts on jaws 23 through the cup-shaped sealing gasket 25 and the washer 26. Gasket 25 and washer 26 are slidably received within the recess provided by coupler body 17b. Compression spring 24, which in the illustration given is a conical spring, exerts pressure against the transversely-extending wall of gasket 25, which in turn exerts pressure against the washer 26, and thereby against the rearward ends of jaws 23 through the beveled flange 26a. The inside of rim 21 provides an arcuate portion 21a which cooperates with the forward ends of the jaws 23 so that the forward ends of the jaws are thrust inwardly by the force exerted by spring 24. Since the construction and operation of hydraulic couplers having clamping jaws like jaws 23 is well-known in the art, it is not believed it will be necessary to further describe it herein.

In the illustration given, the connecting section 17a of the coupler 17 also provides a grease outlet port 27 which cooperates with a ball valve 28 to provide an outlet check valve, the ball valve 28 in the illustration given being biased to closed position by spring 24, as shown in FIGURE 2.

The fitting 18 provides a tapered tip portion 29 at its forward end which forms an application nozzle 30 for applying the grease to a greasing orifice. In the embodiment of FIGURE 1, the tip portion 29 is formed of hard rubber, such as a grease-resistant synthetic rubber. The rubber member is threadedly received on a forward extension 31 of the metal body portion 32. The tip 29 is therefore rigidly integrated with the metal body portion 32.

In accordance with the present invention, the fitting 18 provides a rearward end portion having a ball-shaped projection 33 which is received within socket 20, and a transversely-extending flange 34 which surrounds the base of the projection 33. To fully achieve the objects of the present invention, the flange 34 is dimensioned to overlap and firmly engage the coupler rim 21 when the ball projection 33 is clampingly engaged by the jaws 23, as shown in FIGURE 2. By virtue of this construction and arrangement, the coupler and fitting are integrated as a substantially rigid unit, and can be handled as such in the application of grease. In the embodiment of FIGURE 1, the engaging faces of rim 21 and flange 34 are flat, and extend at right angles to the longitudinal axis of the coupler and fitting. Where the body of the fitting is of smaller diameter than required for producing a substantial overlap between the abutting surfaces of the coupler and fitting, flange 34 can be made of larger diameter than the body 32 of the fitting, as illustrated by the embodiment of FIGURES 1 to 3.

By way of illustration, the following typical dimensions can be set out. When the coupler has an external diameter of ½ inch, the mouth 22 can have a diameter of approximately 5/16 inch. The rim 21, and more particularly the flat, transversely-extending portion thereof, will have a width of approximately 1/16 inch, or an overall diameter of 7/16 inch. The flange 34 can then have a corresponding outside diameter of 7/16 inch. More generally, the area of contact or overlap between the rim 21 and the flange 34 should have a width of at least 1/32 of an inch, and preferably at least 1/16 to 3/32 of an inch. With such dimensions, the metal components of the fittings, such as the fitting 18, can be conveniently formed from ½ inch rod stock.

Turning now to the embodiment of FIGURE 4, there is shown a hand-operated grease gun of the pistol grip-type, which includes a barrel 100 for holding the supply of grease, and a grease dispensing head designated generally by the number 101. The dispensing head includes a high pressure cylinder 102 within which the grease dispensing pressure is generated by the reciprocating piston rod 103, which is actuated by the pivotally mounted handle or pistol grip member 104 through the linkage 105. In the operation of the handle 104, the operator will also grasp the fixed handle or pistol grip member 106.

The grease gun of FIGURE 4 also includes a flexible outlet conduit 107 which is attached to dispensing head 101 by a connector 108. The applicator conduit 107 will usually be formed of a grease-resistant synthetic rubber. The hydraulic coupler 117 which is attached to the outer end of conduit 107 is of the same construction as the coupler 17 previously described. It includes the segmental clamping jaws 123, the socket 120, around the mouth 122 of which there extends the annular rim 134.

In the embodiment of FIGURES 4 and 5, the grease fitting is of a two-part construction, as distinguished from the previously described grease fitting 18 which was in the form of a unitary body. More specifically, the grease fitting of FIGURES 4 and 5 includes a connector body 118a and an applicator body 118b. The connector body provides the ball shaped projection 133, and the applicator body provides the tip 129 and the applicator nozzle 130. If desired, the applicator tip can be formed separately from the body 118b, and united thereto by a suitable means such as a threaded connection. The connector body 118a and the applicator body 118b are united by means of threaded portions, as indicated in FIGURE 4 at 110. FIGURE 4 also illustrates the assembly of the parts with the ball projection 133 extending within coupler 117, and with the coupler rim 134 in firm engagement with the flange 121 which extends around the base of the ball projection 133. The coupler 117, and the fitting comprising the assembly of the connector body 118a and the applicator body 118b, will therefore form a substantially rigid assembly for the application of the grease.

A modified fitting 200 is shown in FIGURE 7. The fitting 200 can be substituted for the fitting 18 in the embodiment of FIGURES 1 to 3. This fitting provides a tapered forward end portion 229 and an applicator tip 230. The rearward end of the fitting similarly provides the ball-shaped projection 233, the base of which is surrounded by flange 221. It will be understood that flange 221 is designed to cooperate with the coupler rim 21 in the same manner as the flange 34 of the fitting 18. The principal difference between the fitting of FIGURE 7 and the one of FIGURES 1 to 3 is that the fitting of FIGURE 7 is formed integrally from one piece of metal.

Operation

In using the grease fittings of the present invention, the desired grease fitting will be assembled with the coupler in the manner previously described. With the ball projection of the fitting received within the socket of the coupler and clamped therein by means of the clamping jaws, the coupler rim surrounding the mouth of the socket will be in firm engagement with the flange of the fitting which surrounds the base of the ball projection, and these parts will thereby be united as a substantially rigid unit. When this assembly is used with a lever-operated grease gun, such as the grease gun of FIGURE 1, one hand of the operator can be on the barrel 10 and the other on the actuating lever 11, while the operator can still direct the fitting to the grease application orifice, and hold the fitting in contact with the orifice while actuating the lever to dispense the grease. As previously indicated, this is possible because of the fact that the coupling 17 and the fitting 18 are a substantially rigid unit. At the same time, however, the fitting 18 can be disengaged from the coupler, and replaced with other fittings of similar construction for applying grease to different points.

The operation is similar where the coupler and fitting asesmbly of this invention is used with grease guns of the pistol grip-type, as illustrated in FIGURE 4 of the drawing. Where the outlet hose is flexible, as may be desired to permit the fitting to be maneuvered for reaching relatively inaccessible greasing points, one hand of the operator can be used to direct the coupler and fitting assembly, while the other hand is employed to dispense the grease by actuating the handles 104, 106. Because of the essential rigidity of the assembly of the coupler 117 with the fitting, 118a, 118b, the operator can exert pressure on the applicator tip 129 to hold the nozzle 130 securely against the greasing point.

While this invention has been described in relation to specific embodiments thereof and many details have been set out for purpose of illustration, it will be apparent to those skilled in the art that the invention is susceptible to further embodiments and that certain of the details described herein can be varied without departing from the basic principles of the invention.

I claim:

1. In combination with a hand-operated grease gun having a rigid outlet pipe rigidly connected thereto, and a coupler rigidly connected to the forward end of said outlet pipe, said coupler including a body providing a socket and a transversely-extending rim surrounding the mouth of said socket, said coupler also including clamping jaw means disposed within said socket, a fitting for applying grease providing a tapered tip portion at its forward end forming an application nozzle, said fitting further providing a rearward portion having a ball-shaped projection received within said socket and a transversely-extending flange surrounding the base of said projection, said flange firmly engaging said coupler rim when said projection is clampingly engaged by said jaw means, whereby said coupler and fitting are rigidly integrated so that an operator holding said grease gun can force said fitting tip against an application orifice without connection thereto.

2. The combination of claim 1 wherein said fitting comprises a unitary body.

3. The combination of claim 1 wherein said fitting comprises a connector body portion and a separate applicator body portion, said applicator body at its forward end providing said application nozzle, and said connector body at its rearward end providing said ball-shaped projection and said surrounding flange, said connector body and said applicator body being threadedly connected.

4. In combination with a hand-operated grease gun having a rigid outlet pipe rigidly connected thereto, and a coupler rigidly connected to the forward end of said outlet pipe, said coupler including a body providing a socket in its outer end portion and an annular transversely-extending rim surrounding the mouth of said socket, said coupler also including spring-biased segmental clamping jaws disposed within said socket, a movable fitting for applying grease to a greasing orifice, said fitting providing a tapered tip portion at its forward end forming an application nozzle, said fitting further providing a rearward end portion having a ball-shaped projection received within said socket and a transversely-extending annular flange surrounding the base of said projection, said flange overlapping and firmly engaging said coupler rim when said projection is clampingly engaged by said jaws, whereby said coupler and fittings are rigidly integrated so that an operator holding said grease gun can force said fitting tip against an application orifice without connection thereto.

5. In combination with a hand-operated grease gun having a rigid outlet pipe rigidly connected thereto, and a coupler rigidly connected to the forward end of said outlet pipe, said coupler including a body providing a socket in its outer end portion and a transversely-extending rim surrounding the mouth of said socket, said coupler also including spring-biased segmental clamping jaws disposed within said socket, a fitting for applying grease providing a tapered application nozzle at its forward end, said fitting further providing a rearward end portion having a projection received within said socket and a transversely-extending flange surrounding the base of said projection, said flange overlapping and firmly engaging said coupler rim when said projection is clampingly engaged by said jaws, the overlapping engaging surfaces of said rim and said flange being flat surfaces and being disposed at right angles to the axis to the longitudinal axis of said coupler and fitting, whereby said coupler and fitting are rigidly integrated so that an operator holding said grease gun can force said fitting tip against an application orifice without connection thereto.

6. The combination of claim 5 wherein said fitting flange projects outwardly further than the portion of said fitting extending between said flange and said application nozzle.

7. The combination of claim 6 wherein said fitting comprises a unitary body.

8. The combination of claim 6 wherein said fitting comprises a connector body portion and a separate applicator body portion, said applicator body at its forward end providing said application nozzle, and said connector body at its rearward end providing said ball-shaped projection and said surrounding flange, said connector body and said applicator body being threadedly connected.

References Cited by the Examiner

UNITED STATES PATENTS

| 982,661 | 1/11 | Dickens. | |
|---|---|---|---|
| 1,443,455 | 1/23 | Bown. | |
| 1,534,173 | 4/25 | Fogelberg. | |
| 2,362,880 | 11/44 | Campbell | 285—102 |

FOREIGN PATENTS 168,812  8/34  France.

LOUIS J. DEMBO, *Primary Examiner.*